Sept. 10, 1935.  G. WHEATLEY  2,014,010
ART OF RETREADING TIRES
Filed Dec. 17, 1934
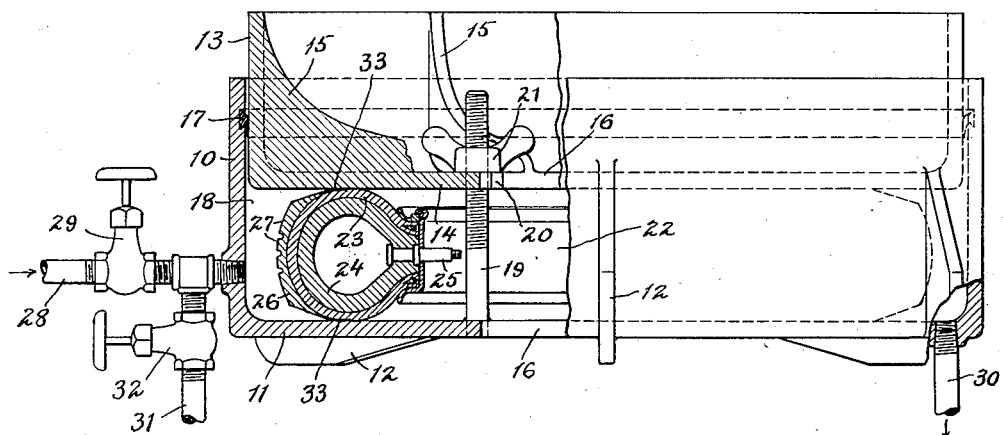
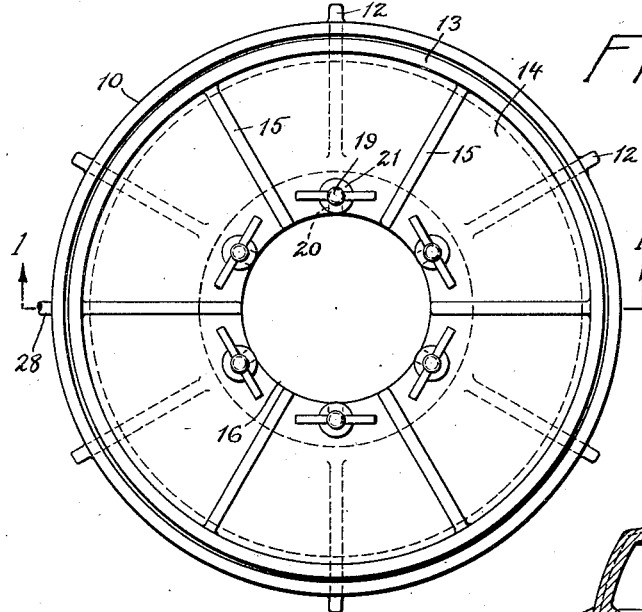
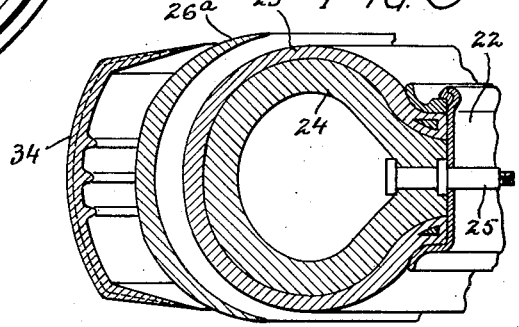
Inventor,
George Wheatley,
By Robert M. Pierson,
Attorney Patented Sept. 10, 1935

2,014,010

UNITED STATES PATENT OFFICE 2,014,010

ART OF RETREADING TIRES

George Wheatley, Milwaukee, Wis., assignor to The Akron Standard Mold Company, Akron, Ohio, a corporation of Ohio Application December 17, 1934, Serial No. 757,863

12 Claims. (Cl. 18—18)

This invention relates to the art of applying rubber treads to tires, particularly in the full-circle retreading of used pneumatic tire carcasses. Among its objects are to reduce the investment in expensive equipment such as metallic molds and inserts, on the part of those engaged in the retreading business, to improve the quality of the work, and to induce the use of a uniformly better quality of tread material than has frequently been employed in the business prior to my invention.

It is well known that the carcasses of pneumatic tires originally built of the same size will grow to a different extent in use under different conditions, but the retreading molds heretofore employed are all of the same cavity dimensions for a given size of tire, and this leads to imperfect work and widely varying mileage on retreaded tires. My invention greatly improves the results in this respect. It further provides the workman with a vulcanizer of lower first cost, which can be used on a large range of tire sizes instead of requiring a different vulcanizer for each size.

Of the accompanying drawing, Fig. 1 is a vertical section, partly in side elevation, illustrating the performance of my invention and including a preferred form of apparatus.

Fig. 2 is a top plan view on a smaller scale.

Fig. 3 is a sectional view of a modification, illustrating the tire and tread and matrix elements spaced apart.

Fig. 4 is a partial vertical section on a smaller scale showing a second modification.

In the drawing, 10 is a vulcanizer body in the form of a shallow cylinder with an open top and an annular flat bottom wall 11, externally reinforced with radial ribs 12, and 13 is a removable piston-like member or cover slidingly fitted within the cylinder of said body and having a flat bottom wall 14 parallel with the wall 11, together with internal reinforcing radial ribs 15. The members 10 and 13 together form a vulcanizing receptacle. The flat walls 11 and 14 are formed with central openings 16 for admitting the atmosphere to the base portions of the tire to help in avoiding overheating of said portions and allow access through the upper opening to the tire-inflating valve if required. Between the cylindrical portions of the body 10 and member 13 is interposed a lip packing ring 17 of flexible material such as vulcanized rubber, having its base anchored in a groove in the wall of the body 10, for sealing the heating chamber 18 formed between the members 10 and 13 and the tire to be retreaded.

To the bottom wall 11 of the body member 10 are secured a circular series of vertical posts 19 having screw-threaded upper ends projecting through radial slots 20 formed in the inner margin of the bottom wall 14 of member 13, and upon said posts are screwed removable wing nuts 21 bearing against the upper side of the wall 14 for moving member 13 downwardly to perform the preliminary tire sealing operation.

Mounted upon an ordinary tire rim 22 within the vulcanizer is a used tire carcass 23, from which the remains of the old tread and a part of the side rubber have been removed by the usual methods and in which has been inserted a flexible and stretchable core or bag 24 made of the usual material such as vulcanized rubber and provided with an inflating stem 25. 26 is the rubber retread band applied upon the carcass 23 and having its edges extended radially inward to a point about midway of the sides of the tire so that said edges can be sealed against the inflated carcass by the bottom and top walls 11 and 14 of the tire-receiving space within the vulcanizer.

In the preferred mode of practicing the invention, the tread band 26 is produced in endless form and with a concavo-convex transverse curvature approximating that of the tire, and is given a semi-cure or partial vulcanization in a tread mold which imparts to the band substantially its ultimate shape including the formation of the usual non-skid projections 27 such as ribs and blocks with intervening grooves or recesses.

28 is an inlet pipe leading through the cylindrical wall of the body member 10 into the heating or vulcanizing chamber 18, and provided with a shut-off valve 29, for supplying to the latter a heated fluid medium under super-atmospheric pressure. 30 is an outlet pipe leading through the bottom wall 11 of the body member at an opposite point on the vulcanizer. 31 is a cold-water pipe in branch connection with the inlet pipe 28 and having a shut-off valve 32. The heating medium may be either steam at the usual 40 to 50 lbs. pressure employed in vulcanizing operations, or it may be water heated to the necessary temperature, and in either case the outlet pipe 30 will be provided with the usual trap valve or other means for maintaining the necessary back pressure in the chamber 18. The pressure of the fluid vulcanizing medium acts uniformly and along lines radial to the cross section and to the circumference of the tire, throughout the area exposed to said pressure, and in this embodiment the vulcanizing medium is in direct contact with the exposed surface of the tread band 26 throughout said area.

In retreading a tire with the described apparatus, the rim-mounted carcass 23, which has been denuded of its old tread and side rubber down to the sealing zones, is provided with the internal pressure bag 24, which is lightly inflated with compressed air through the valve stem 25. The surface which is to receive the tread band 26 is given a coating of rubber cement, and the semi-cured band is applied thereto and rolled down to squeeze out any air entrapped between itself and the carcass.

The top vulcanizer member 13 having been removed, the tire assembly is placed approximately centrally of the receptacle, but since the tread is unconfined and the plates 11 and 14 which confine the sides are flat and parallel, it is unnecessary to have the tire exactly central unless the flat plates are formed to mold a concentric side design. The cover member 13 is then restored within the body member 10 to rest on the upper side of the tire against the upper margin of the tread band while the lower tire side and tread band margin rest against the bottom wall 11 of the vulcanizer body so that a seal is made on both sides, between the carcass and the vulcanizer walls 11 and 14, at and by means of the tread band edges, when pressure and rigid mechanical resistance are applied. The post nuts 21 are then applied and screwed down to slightly compress the tire. Either before or after applying such compression, the pressure bag 24 is further inflated to a pressure somewhat above that of the vulcanizing medium before the latter is turned into the chamber 18, thereby providing a tight sealing pressure on both sides of the tire, at the annular opposite zones 33, to prevent the escape of the vulcanizing medium or its entrance between the tread band and the carcass.

Steam or hot water being then admitted at the desired pressure to the chamber 18, vulcanization of the tread band upon the carcass proceeds until completed, while water of condensation drains through the outlet pipe 30 or cooled portions of a hot-water medium are withdrawn therethrough to maintain a circulation. The portions of the carcass under the tread band are sufficiently protected by said band against over-vulcanization, and the remaining portions are protected by exposure to the atmosphere. The form of the tread band including its non-skid projections having previously been imparted by a semi-cure in the tread vulcanizing mold, is not thereafter changed by the final vulcanization performed as herein described. When the vulcanization is complete, the supply of heating medium is cut off by closing the valve 29, the valve 32 is opened and a supply of cold water is admitted to the chamber 18 to rapidly cool the tire and counteract any tendency of the vulcanized tread or its joint with the carcass to blow or blister.

In the modification illustrated in Fig. 3, an endless, flexible matrix band 34, which may be made of vulcanized rubber or rubber-like substance reinforced with fabric and which is formed on its inner surface with a negative of the non-skid tread, is employed as a tread-molding member in connection with an uncured rubber tread band 26ª, for application to a rim-mounted, used tire carcass 23, and for sealing and vulcanization in the manner previously described. The matrix band is slightly compressible and therefore can be made endless, but might be slidingly lap-jointed at its ends. The uncured tread band 26ª may be either originally flat or curved to tire form in cross section as illustrated and provided on its inner surface with a temporary protective covering, such as holland cloth, which is stripped off immediately before applying the band to the tire carcass. To clearly illustrate the separate members 23, 26ª and 34, Fig. 3 shows them spaced apart rather than in their assembled relation. During the vulcanizing operation, the pressure and heat of the heated medium in the chamber 18 are transmitted to the tread band through the matrix band 34 uniformly and in a radial direction throughout the latter's area, while the edges of the tread band are sealed as previously described in connection with Fig. 1, the edges of the matrix band being included in the seal if desired. A number of matrix bands such as 34 may be cheaply produced from a single band mold, will last through several heats and are more convenient to use in retreading operations than metal molds, besides allowing for differences in the actual dimensions of used tire carcasses which were originally of the same size.

The modification illustrated in Fig. 4 shows my invention adapted for retreading a plurality of tires, stacked in a tier, in the same vulcanizer. Two tires are shown in this case, with an annular, flat side-sealing plate 35 intervening, additional similar plates being interposed between each successive pair if the number of tires is greater than two. The receptacle is deepened for two or more tires to correspond with the desired capacity, and is capable of use with a single tire although designed for a greater number.

With the use of my invention, retreading work of a uniformly higher quality and yielding a longer average tire mileage can be performed as compared with the usual molding method, because the invention allows for variation in the actual size of the used carcasses. The investment of the user of this vulcanizing equipment is much reduced because of its lower initial cost and avoidance of the necessity of employing metal molds or mold inserts for a variety of tread patterns, and also because a single vulcanizer can be used for a wide range of tire sizes. A manufacturer of the semi-cured tread bands or of the matrix bands herein described can supply the different sizes and patterns of treads more cheaply than molds can be supplied on account of producing the treads in large quantities and distributing them to various users of the equipment, besides which the tread manufacturer can exercise control over the quality of the rubber compound to be used with the described apparatus, which has been found impossible in buying the material from many sources under previously existing methods of conducting the business.

It will be understood that the above-described procedure and form of the apparatus may be more or less varied without departing from the scope of my invention as defined in the claims.

I claim:

1. A tire-treading method which comprises applying a vulcanizable rubber tread band to a previously vulcanized tire body, maintaining said body in a condition to withstand an inwardly exerted vulcanizing pressure, sealing said band by pressure and rigid resistance against the middle region of the sides of said body, leaving an area of said band unsealed, and vulcanizing the band upon the body by applying uniformly throughout the unsealed area of the band and radially inward thereof the pressure and heat of a heated fluid medium.

2. A pneumatic-tire retreading method which comprises applying to a used tire carcass a vulcanizable rubber tread band, distending the carcass with internal pressure, sealing said band against the middle region of the sides of said carcass, leaving an area of said band unsealed, and vulcanizing the band upon the carcass by applying uniformly throughout the unsealed area of said band and radially inward thereof the pressure and heat of a heated fluid medium, while exposing the base and adjacent portions of the tire to a cooling medium.

3. A method according to claim 2 in which the tread band, before application to the carcass, is semi-vulcanized and provided with non-skid projections, and the heated fluid medium is applied directly against said band.

4. A pneumatic-tire retreading method which comprises preparing and semi-vulcanizing an endless rubber tread band transversely curved approximately to tire shape and provided with non-skid projections, applying said band to a used tire carcass, sealing said band against the sides of the carcass approximately midway of said sides, by a distending fluid pressure within the carcass and an external rigid resistance, exposing said band throughout its unsealed area to direct contact with a heated fluid medium under a super-atmospheric pressure less than that of the carcass-distending pressure, and thereby vulcanizing the tread band upon the carcass.

5. A pneumatic-tire treading method which comprises applying to a tire carcass a vulcanizable rubber tread band, providing a heating chamber on the outer side of said band, sealing the chamber and the tread-band edges against the carcass, maintaining the carcass distended by internal pressure, admitting a fluid heating medium under pressure to said chamber and against the tread band to vulcanize the band upon the carcass, and admitting cold water to said chamber to cool the hot vulcanized tread and the carcass.

6. Tire retreading apparatus comprising a vulcanizing receptacle composed of tire-side sealing members relatively adjustable toward and from each other for sealing and to accommodate different sized tires and adapted to form, with the contained work, a heating chamber adjacent the tire tread, varying in width according to the tire size, and means for supplying a fluid-pressure vulcanizing medium to said chamber.

7. Apparatus according to claim 6 having means for shutting off the supply of vulcanizing medium and for admitting cold water to said chamber.

8. Tire retreading apparatus comprising a vulcanizing receptacle composed of substantially flat, parallel, tire-side sealing members relatively movable toward and from each other and adapted to form, with the contained work, a heating chamber adjacent the tire tread, and means for supplying a vulcanizing medium to said chamber.

9. Apparatus according to claim 8 in which one or both of said sealing members is apertured for admission of atmospheric air to the base portions of the tire.

10. Tire retreading apparatus comprising a vulcanizing receptacle composed of a cylinder member having a substantially flat tire-supporting bottom wall, a removable, piston-like cover member slidable therein and having a substantially flat tire-contacting bottom wall parallel with that of the cylinder member, said members being adapted to form, with the contained work, a heating chamber adjacent the tire tread, adjustable means for holding down said cover member, and a pipe for admitting a vulcanizing medium to said chamber.

11. Apparatus according to claim 10 in which the adjustable hold-down means is a central annular series of threaded posts attached to the bottom wall of the cylinder member and having nuts screwing thereon for engaging the upper side of the bottom wall of said cover member.

12. Tire retreading apparatus comprising a vulcanizing receptacle of a depth to receive a plurality of tires in a stack and composed of a cylinder member and a cover member slidable therein, said members having respective bottom walls for sealing the lower side of the lowermost and the upper side of the uppermost tire of a stack, and adapted to form, with the contained work, a heating chamber embracing the several tire treads, and a tire-side sealing plate for each pair of adjacent tires, adapted to be interposed between the members of said pair.

GEORGE WHEATLEY.